(12) United States Patent
Pawar et al.

(10) Patent No.: US 9,674,861 B1
(45) Date of Patent: Jun. 6, 2017

(54) SYSTEMS AND METHODS FOR SCHEDULING TRANSMISSIONS FROM AN ACCESS NODE IN A COMMUNICATION NETWORK

(71) Applicant: Sprint Spectrum LP, Overland Park, KS (US)

(72) Inventors: Hemanth Pawar, Brambleton, VA (US); Shilpa Kowdley, Brambleton, VA (US); Krishna Sitaram, Chantilly, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 222 days.

(21) Appl. No.: 14/576,331

(22) Filed: Dec. 19, 2014

(51) Int. Cl.
*H04W 72/12* (2009.01)
*H04W 88/12* (2009.01)

(52) U.S. Cl.
CPC ........ *H04W 72/1242* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 8,005,087 B2 | 8/2011 | Dolganow et al. | |
| 8,971,345 B1* | 3/2015 | McCanne | H04L 47/6215 370/412 |
| 2009/0285201 A1* | 11/2009 | Ben-Haim | H04L 12/66 370/352 |
| 2012/0176896 A1* | 7/2012 | Denman | H04L 43/028 370/230.1 |
| 2013/0144979 A1* | 6/2013 | Kansal | H04N 21/23106 709/219 |
| 2014/0022904 A1* | 1/2014 | Ahmad | H04W 28/0231 370/235 |
| 2015/0009826 A1* | 1/2015 | Ma | H04W 28/0268 370/235 |
| 2015/0271827 A1* | 9/2015 | Hamalainen | H04W 76/04 455/452.2 |

\* cited by examiner

*Primary Examiner* — Gary Mui (57) ABSTRACT

Systems and methods are described for scheduling transmissions from an access node. A traffic distribution and usage pattern associated with an access node may be determined based on an inspection of packet transmission data. A scheduling algorithm may be assigned to a particular set of usage characteristics based on the determined traffic distribution and usage pattern. The traffic distribution and usage pattern associated with the access node may be monitored for a set of criteria. The scheduling algorithm may be selected based on the monitored traffic distribution and packet data for at least one wireless device may be transmitted using the selected scheduling algorithm.

18 Claims, 5 Drawing Sheets

SYSTEMS AND METHODS FOR SCHEDULING TRANSMISSIONS FROM AN ACCESS NODE IN A COMMUNICATION NETWORK

TECHNICAL BACKGROUND

Telecommunication systems, such as cellular networks or other wireless networks, use various network links throughout the communication network to communicate. For example, an access node may transmit signals over a signal radius, and one or more wireless devices within the signal radius may attempt to establish a connection with the access node.

In certain circumstances, a portion of the network may experience high load, e.g., loading above a threshold, that stems from large amounts of data traffic or poor channel conditions. The access node may implement a pre-configured and fixed scheduler that manages a sequence of packet transmissions based on radio frequency (RF) needs of connected wireless devices. Because the scheduler is primarily driven by RF needs, there is no dynamic scheduling based on user experience. Accordingly, a dynamic, channel-aware system that effectively balances load and dynamically schedules packet transmissions from an access node to provide a high quality service to users is desirable.

Overview

Systems and methods are described for scheduling transmissions from an access node. In one instance, a traffic distribution and usage pattern associated with an access node may be determined. The traffic distribution and usage pattern may be based on an inspection of packet distribution data. A scheduling algorithm may be assigned to a particular set of usage characteristics based on the determined traffic distribution and usage pattern. Traffic distribution and usage associated with the access node may be monitored for a set of criteria. The scheduling algorithm may be selected based on the monitored traffic distribution and packet data for at least one wireless device may be transmitted using the selected scheduling algorithm.

DETAILED DESCRIPTION

Figure 1:
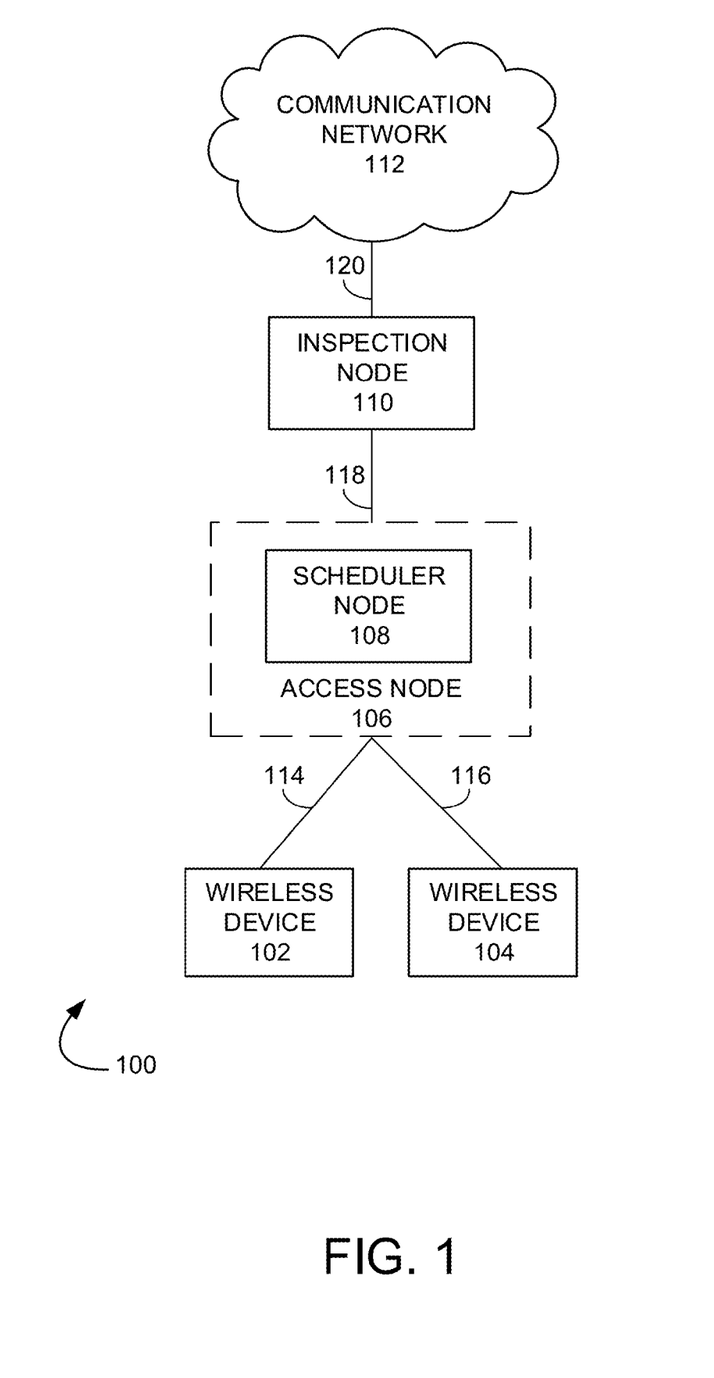
FIG. 1 illustrates an exemplary communication system for scheduling transmissions from an access node in a communication network.

FIG. 1 illustrates an exemplary communication system 100 for scheduling transmissions from an access node in a communication network. Communication system 100 can comprise, for example, a wireless devices 102, 104, access node 106, scheduler node 108, inspection node 110, and communication network 112. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between wireless devices 102, 104, access node 106, scheduler node 108, inspection node 110, and communication network 112 which are omitted for clarity, including additional processing nodes, routers, gateways, and physical and/or wireless data links for carrying data among the various network elements.

Wireless devices 102, 104 can be any device configured to communicate over system 100 using a wireless communication link. For example, wireless devices 102, 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with access node 106, any number of wireless devices can be implemented according to various exemplary embodiments disclosed herein.

Wireless devices 102, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access node 106 can include scheduler module 108 and can be any network node configured to provide communication between wireless devices 102, 104 and communication network 112. Access node 106 can be short range access node or a standard access node. A short range access node could include a microcell base station, a picocell base station, a femtocell base station, or the like. A standard access node could include Base Transceiver Stations (BTSs), Radio Base Stations (RBSs), Radio Network Controllers (RNCs), a NodeB device, or an enhanced NodeB (eNodeB) device, or the like. It is noted that while one access node 106 is illustrated in FIG. 1, any number of access nodes can be implemented within system 100.

Communication network 112 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 112 can be capable of carrying data, for example, to support voice, push-to-talk, broadcast video, and data communications by a wireless device, for example, wireless device 102. Wireless network protocols can comprise Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 112 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 112 can also comprise additional base stations, controller nodes, telephony switches, internet routers, network gateways, computer systems, communication links, or some other type of communication equipment, and combinations thereof.

Communication links 114, 116, 118, 120 can be wired or wireless and use various communication protocols such as Internet, Internet Protocol (IP), Local-Area Network (LAN), optical networking, Hybrid Fiber Coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 114, 116, 118, 120 can be a direct link or might include various equipment, intermediate components, systems, and networks.

In operation, access node 106 may communicate with wireless devices 102, 104. In an exemplary embodiment, the communication system 100 may provide wireless communication services to multiple carriers and subcarriers on different frequency bands (e.g., 1.25 GHz carrier, 1900 MHz carrier, 800 MHz carrier, etc.) and channels (e.g., 5 MHz channels, 10 MHs channels, 15 MHz channels, etc.). Access node 106 may utilize scheduler node 108 to coordinate transmissions of wireless resources (e.g., the next available physical resource blocks, wireless spectrum, etc.) among connected wireless devices 102, 104. For example, in an exemplary embodiment, the scheduler node 108 can collect and store capacity and transmission delay characteristics (e.g., buffered data, signal quality, throughput, guaranteed bit rate/non-guaranteed bit rate, busy hour, backhaul limitations/capacity, mobility, available spectrum, etc.) reported by wireless devices 102, 104 at access node 106. Access node 106 and scheduler node 108 may distribute the wireless resources (e.g., the next available physical resource blocks, wireless spectrum, etc.) via a scheduling algorithm among connected wireless devices 102, 104 based on the collected characteristics. In another exemplary embodiment, the scheduling algorithm can include, for example, a proportional fairness scheduling algorithm, a data rate scheduling algorithm, or a hybrid scheduling algorithm.

Figure 2:
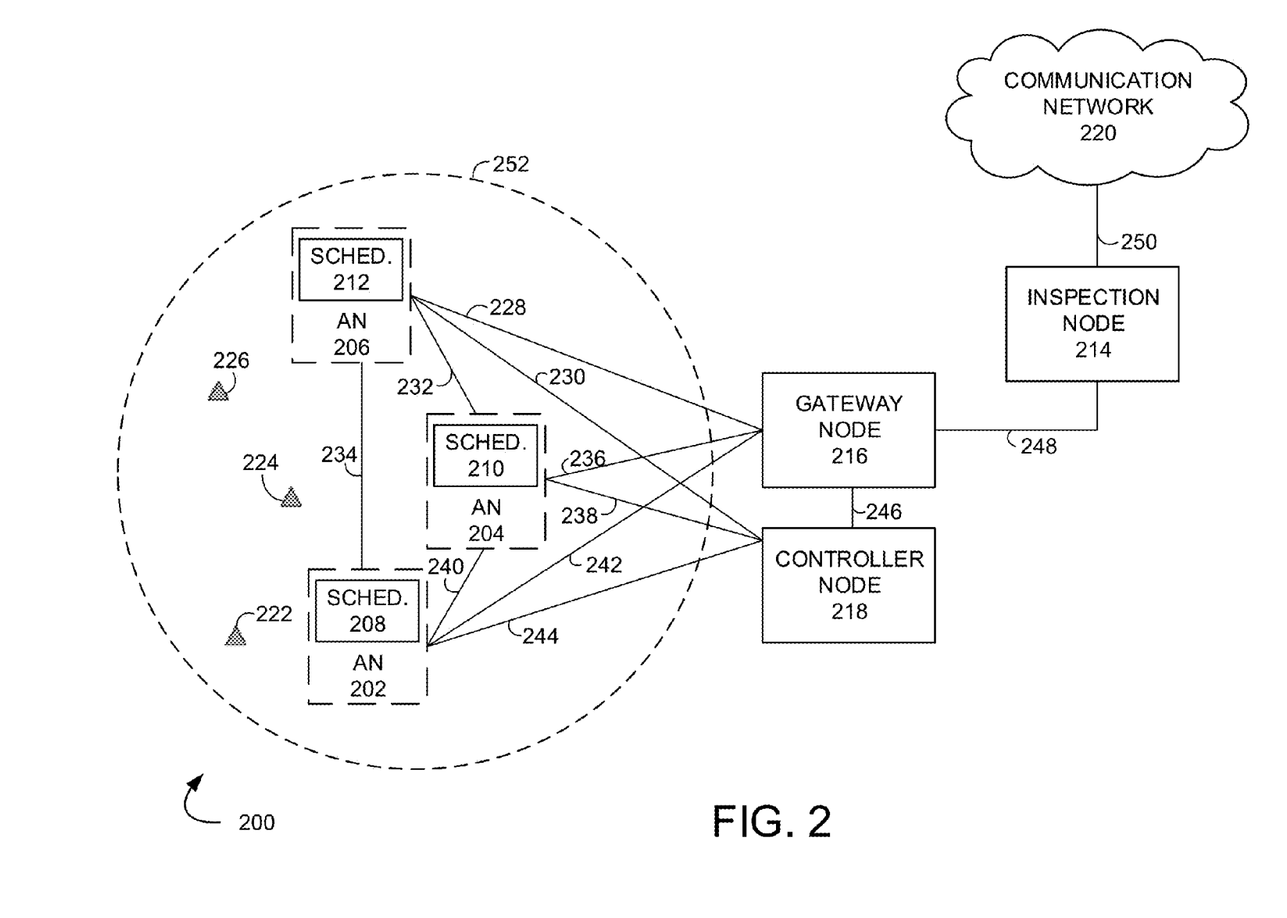
FIG. 2 illustrates another exemplary communication system for scheduling transmissions from an access node.

FIG. 2 illustrates another exemplary communication system 200 for scheduling transmissions from an access node. Communication system 200 can comprise wireless devices 222, 224, 226, access nodes 202, 204, 206, schedulers 208, 210, 212, inspection node 214, gateway node 216, controller node 218, and communication network 220. Inspection node 214 may comprise a computer or router such as a Deep Packet Inspection (DPI) router. Other network elements may be present in the communication system 200 to facilitate communication but are omitted for clarity, such as base stations, base station controllers, gateways, mobile switching centers, dispatch application processors, and location registers such as a home location register or visitor location register. Furthermore, other network elements may be present to facilitate communication which are omitted for clarity, including additional processing nodes, routers, gateways, and physical and/or wireless data links for carrying data among various network elements.

Wireless devices 222, 224, 226 can be any device configured to communicate over communication system 200 using a wireless interface. For example, wireless devices 222, 224, 226 can include a remote terminal unit, a cell phone, a smart phone, a computing platform such as a laptop, palmtop, or a tablet, a personal digital assistant, or an internet access device, and combinations thereof.

The wireless interface of wireless devices 222, 224, 226 can include one or more transceivers for transmitting and receiving data over communication system 200. Each transceiver can be associated with the same or different frequency bands, the same or different radio access technologies, the same or different network providers, and/or the same or different services. For example, wireless devices 222, 224, 226 can include a transceiver that is associated with one or more of the following: Code Division Multiple Access (CDMA), Global System for Mobile communications (GSM), Worldwide Interoperability for Microwave Access (WiMAX), Long-Term Evolution (LTE), and/or High-Speed Downlink Packet Access (HSDPA), IEEE 802.11, Wireless Fidelity (Wi-Fi), Bluetooth, Zigbee, Infrared Data Association (IrDA), Multimedia Broadcast Multicast Service (MBMS), etc.

Wireless devices 222, 224, 226 can transmit and/or receive information over communication system 200 using various communication services. These services can include various voice, data, and/or MBMS services and applications. For example, mobile voice services, mobile data services, push-to-talk services, internet service web browsing, email, pictures, picture messaging, video, video messaging, broadcast video, audio, voicemail, music, MP3's, ring tones, stock tickers, new alerts, etc.

Access nodes 202, 204, 206 can be any network node configured to provide communication between wireless devices 222, 224, 226 and communication network 220 and can include schedulers 208, 210, 212. Access nodes 202, 204, 206 can be standard access nodes or short range, low power access nodes. A standard access node could include Base Transceiver Stations (BTSs), Radio Base Stations (RBSs), Radio Network Controllers (RNCs), a NodeB device, or an enhanced NodeB (eNodeB) device, or the like. A short range access node can include a microcell base station, a picocell base station, a femtocell base station, or the like, for example, a home eNodeB device. In addition, a wireless device configured to enter a hotspot mode can be a femtocell access node. It is noted that while three access nodes 202, 204, 206 are illustrated in FIG. 2, any number of access nodes can be implemented within system 200.

Access nodes 202, 204, 206 can comprise a processor and associated circuitry to execute or direct the execution of computer-readable instructions to obtain information. Access nodes 202, 204, 206 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 202, 204, 206 can receive instructions and other input at a user interface.

Inspection node 214 can comprise a processor and associated circuitry to execute or direct the execution of DPI. Inspection node 214 can comprise a processor and associated circuitry to execute or direct the execution of computer-readable instructions to obtain information. Inspection node 214 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Inspection node 214 can receive instructions and other input at a user interface.

Inspection node 214 can be configured to relay, monitor, and/or inspect communications between wireless devices 222, 224, 226 and communication network 220. For example, in an exemplary embodiment, inspection node 214 may be configured to perform DPI on capacity and transmission delay characteristics (e.g., buffered data, signal quality, throughput, guaranteed bit rate/non-guaranteed bit rate, busy hour, backhaul limitations/capacity, mobility, available spectrum, etc.) encapsulated in a plurality of data packet transmissions reported by wireless devices 224, 226, 228 at access nodes 204, 206, 208. Inspection node 214 may use DPI to determine an application requirement of communication services in use by wireless devices 224, 226, 228. These services can include various voice, data, and/or MBMS services and applications. For example, mobile voice services, mobile data services, push-to-talk services, internet service web browsing, email, pictures, picture messaging, video, video messaging, broadcast video, audio, voicemail, music, MP3's, ring tones, stock tickers, new alerts, etc. In an exemplary embodiment, inspection node 214 may be configured to determine a traffic distribution and usage pattern for wireless devices 222, 224, 226 operating in geographic area 252.

Gateway node 216 can be any network node configured to interface with other network nodes using various protocols that communicate, route, and forward communication data addressed to wireless devices 222, 224, 226. In addition, gateway node 216 can act as a mobility anchor for wireless devices 222, 224, 226 during handovers between different frequencies and/or different radio access technologies supported by the same access node. Gateway node 216 can be a standalone computing device, computing system, or network component, and can be accessible, for example, by a wired or wireless connection, or through an indirect connection such as through a computer network or communication network. For example, gateway node 216 can include a Serving Gateway (SGW) and/or Public Data Network Gateway (PGW), etc. One of ordinary skill in the art would recognize that gateway node 216 is not limited to any specific technology architecture, such as Long Term Evolution (LTE) and can be used with any network architecture and/or protocol.

Gateway node 216 can comprise a processor and associated circuitry to execute or direct the execution of computer-readable instructions to obtain information. Gateway node 216 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 216 can receive instructions and other input at a user interface.

Controller node 218 can be any network node configured to communicate information and/or control information over communication system 200. Controller node 218 can be configured to transmit control information associated with a handover procedure. Controller node 218 can be a standalone computing device, computing system, or network component, and can be accessible, for example, by a wired or wireless connection, or through an indirect connection such as through a computer network or communication network. For example, controller node 218 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that controller node 218 is not limited to any specific technology architecture, such as Long Term Evolution (LTE) and can be used with any network architecture and/or protocol.

Controller node 218 can comprise a processor and associated circuitry to execute or direct the execution of computer-readable instructions to obtain information. Controller node 218 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 218 can receive instructions and other input at a user interface.

While not illustrated in FIG. 2 for clarity, wireless device 222 can be in communication with access node 202, wireless device 224 can be in communication with access node 204, and wireless device 226 can be in communication with access node 206 through communication links. User communication between wireless devices 222, 224, 226 and access nodes 202, 204, 206 could share the same representative wireless link, but be transferred over different communication sessions, frequencies, timeslots, packets, ports, sockets, logical transport links, or in different directions—including combinations thereof.

Access node 206 can be in communication with gateway node 216 through communication link 228, controller node 218 through communication link 230, access node 204 through communication link 232, and access node 202 through communication link 234. Access node 206 can be in communication with inspection node 215 through communication links 228, 248. Access node 204 can be in communication with gateway node 216 through communication link 236, controller node 218 through communication link 238, and access node 202 through communication link 240. Access node 204 can be in communication with inspection node 214 through communication links 236, 248. Access node 202 can be in communication with gateway node 216 through communication link 242, controller node 218 through communication link 244, and inspection node 214 through communication links 242, 248. Controller node 218 can be in communication with gateway node 216 through communication link 246 and communication network 220 through communication links 248, 250. Gateway node 216 can be in communication with inspection node 214 through communication link 248 and communication network 220 through communication link 250.

Communication links 228, 230, 232, 234, 236, 238, 240, 242, 244, 246, 248, 250 can be wired or wireless and use various communication protocols such as internet, internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (Wi-MAX), or Long Term Evolution (LTE), or combinations thereof. Communication links 228, 230, 232, 234, 236, 238, 240, 242, 244, 246, 248, 250 can be a direct link or might include various equipment, intermediate components, systems, and networks.

Communication network 220 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 220 can be capable of carrying data, for example, to support voice, push-to-talk, broadcast video, and data communications by a wireless device, such as wireless device 222. Wireless network protocols can comprise code division multiple access (CDMA), 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 220 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 220 can also comprise additional base stations, controller nodes telephony switches, internet routers, network gateways, computer systems, communication links, or some other type of communication equipment, and combinations thereof.

In operation, access node 202, 204, 206 can include a data scheduler 208, 210, 212. Alternatively, Base Band Units (BBUs) of access nodes 202, 204, 206 can be centrally located at baseband pool (not shown) and may include a centralized data scheduler (not shown). Data schedulers 208, 210, 212 can be configured to coordinate packet transmissions of minimum schedulable physical resource blocks (e.g., two resource blocks per one transmission time interval) from access nodes 202, 204, 206 among connected wireless devices 222, 224, 226 operating in geographic area 252 in communication system 200.

For example, in an exemplary embodiment, data schedulers 208, 210, 212 may collect and store capacity and transmission delay characteristics (e.g., buffered data, signal quality, throughput, guaranteed bit rate/non-guaranteed bit rate, busy hour, backhaul limitations/capacity, mobility, available spectrum, etc.) reported by wireless devices 224, 226, 228 at access nodes 202, 204, 206. Data schedulers 208, 210, 212 can prioritize and distribute wireless resources (e.g., the next available physical resource blocks, wireless spectrum, etc.) among connected wireless devices 222, 224, 226 located in geographic area 252 via a scheduling algorithm based on the collected characteristics. The scheduling algorithm can include, for example, a proportional fairness scheduling algorithm (e.g., low proportional fairness, medium proportional fairness, and high proportional fairness), a data rate scheduling algorithm, and/or a hybrid scheduling algorithm.

In another exemplary embodiment, communication network 220 via data schedulers 208, 210, 212 can initially calculate a Channel Quality Indicator (CQI) value for each connected wireless device 222, 224, 226. The CQI value can be based on, for example, a reference signal level, e.g., measured in signal to interference plus noise ratio (SINR), received at wireless device 222, 224, 226 located in geographic area 252 from an access node 202, 204, 206. The CQI value can be tracked by the access node 202, 204, 206 and/or controller node 218 based on measurement reports transmitted from the wireless device 222, 224, 226 to access node 202, 204, 206. The CQI value for each wireless device 222, 224, 226 may be updated periodically.

Proportional fairness scheduling algorithms, for example, a round robin algorithm, may use the calculated CQI value for each connected wireless device 222, 224, 226 to distribute wireless resources (e.g., the next available physical resource blocks, wireless spectrum, etc.) equally among wireless devices 222, 224, 226 connected to an access node 202, 204, 206 to achieve high proportional fairness. Alternatively, in some instances, data scheduler 208, 210, 212 may use a scheduling algorithm with low proportional fairness to distribute greater amounts of wireless resources to connected wireless devices 222, 224, 226 that report high CQI values and can achieve higher data transmission rates. Proportional fairness scheduling algorithms provide the highest degree of throughput fairness, but generally have the lowest average throughput. For example, proportional fairness scheduling algorithms can range from maximizing overall sector throughput by preferring, for example, wireless devices 222, 224, 226 experiencing low transmission delays over those experiencing low throughput, for example, wireless devices 226 operating at the edge of a geographic area 252. Proportional fairness scheduling algorithms may also prefer wireless devices, for example, wireless device 226, experiencing high transmission delays and low throughput at the expense of overall sector throughput.

Data rate scheduling algorithms, for example, a maximum CQI scheduling algorithm, schedule wireless resources (e.g., the next available physical resource blocks, wireless spectrum, etc.) for a connected wireless device, for example, wireless device 224, reporting the highest channel quality (e.g., highest reported CQI). Data rate scheduling algorithms provide the maximum possible average throughput, but generally have low throughput fairness since wireless resources are scheduled based on the highest reported CQI.

Hybrid scheduling algorithms, for example, Quality of Service (QoS) based proportional fairness scheduling algorithms, schedule wireless resources (e.g., the next available physical resource blocks, wireless spectrum, etc.) for a connected wireless device, for example, wireless device 222, whose instantaneous channel conditions are better than average channel conditions. For example, in an exemplary embodiment, communication system 200 may track CQI values for each wireless device 222, 224, 226 connected to access nodes 202, 204, 206 in geographic area 252 over a time period (e.g., minutes, hours, etc.). The tracked CQI values may be averaged for each wireless device 222, 224, 226 over the time period (e.g., average CQI value). An instantaneous CQI value may be determined for each wireless device 222, 224, 226 connected to access nodes 202, 204, 206 and a metric may be calculated (for each wireless device 222, 224, 226) based on a ratio of the instantaneous CQI value per average CQI value. The communication system 200 schedules the next available physical resource block for the wireless device, for example, wireless device 222, with the highest calculated metric. Hybrid scheduling algorithms balance throughput and fairness, but generally have a high computation power.

In some instances, the settings of the data scheduler 208, 210, 212 may be pre-configured and fixed. This may result in, for example, a trade-off between maximizing user experience and maximizing wireless resource (e.g., the next available physical resource blocks, wireless spectrum, etc.) efficiencies since the settings of the data scheduler 208, 210, 212 are mostly driven by wireless resource needs of the connected wireless device 222, 224, 226. In some instances, distribution and traffic patterns of wireless devices 222, 224, 226 located in geographic area 252 may vary based on, for example, time of day and wireless device 222, 224, 226 user behavior. For example, in a dense geographic area 252, communication network 220 may experience increased usage of wireless devices 222, 224, 226 during daytime hours and decreased usage during nighttime hours throughout the week. The same dense geographic area 252 may experience an entirely different wireless device 222, 224, 226 usage pattern over weekend hours. In addition, the types of applications, e.g., emails, web browsing, voice, video streaming, etc., in use by wireless device 222, 224, 226 and consumption of wireless resources (e.g., the next available physical resource blocks, wireless spectrum, etc.) by wireless devices 222, 224, 226 during these time segments may also differ.

A need exists for a data scheduler 208, 210, 212 that dynamically schedules wireless resources (e.g., the next available physical resource blocks, wireless spectrum, etc.) based on traffic distribution and usage patterns of wireless devices 222, 224, 226 operating in geographic area 252.

Figure 3A:
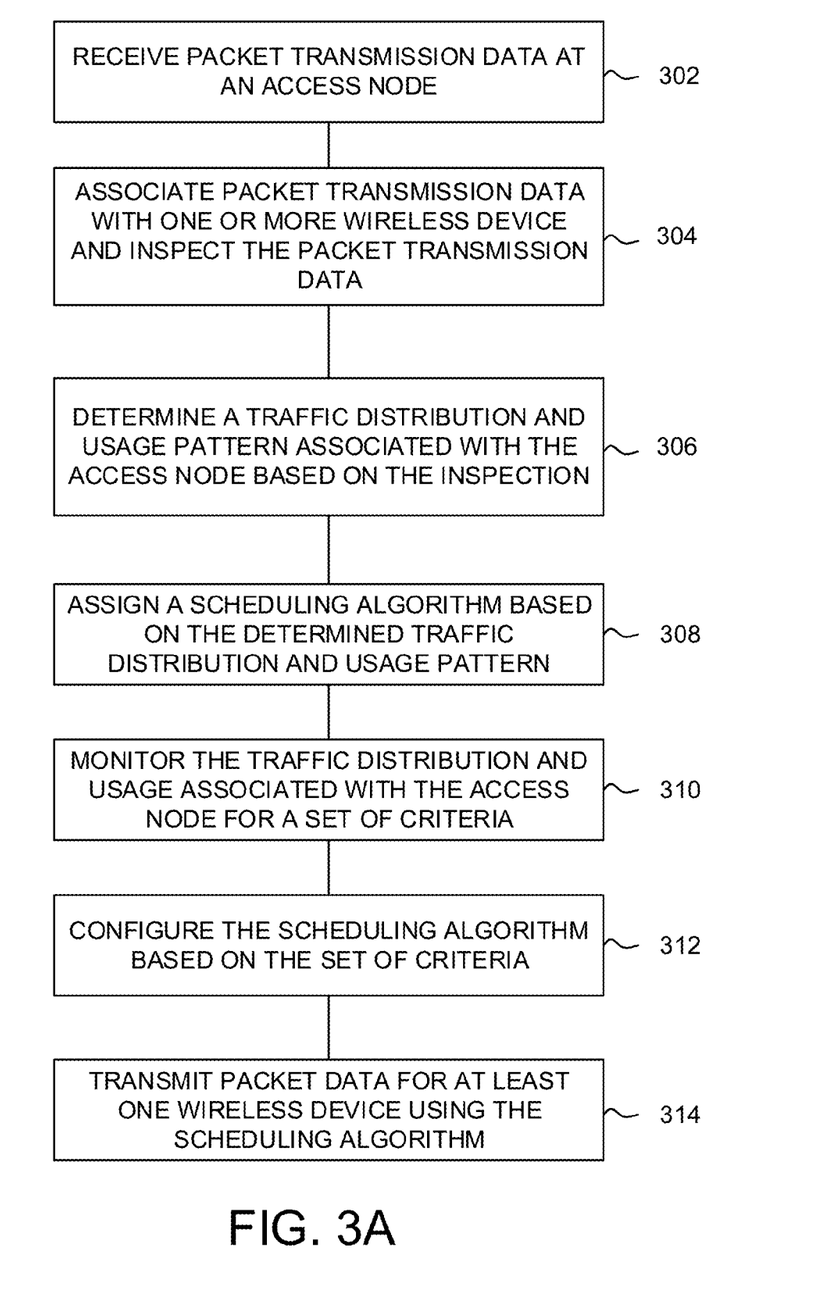
FIGS. 3A and 3B illustrate an exemplary method for scheduling transmissions from an access node.

FIG. 3A illustrates an exemplary method for scheduling transmissions from an access node in a communication network. The method will be discussed with reference to the exemplary communication system 200 illustrated in FIG. 2. However, the method can be implemented in the exemplary communication system 100 illustrated in FIG. 1 or any other suitable communication system. In addition, although FIG. 3A depicts steps performed in a particular order for purpose of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 3A, at step 302, a network node can receive a plurality data packet transmissions at an access node from a connected wireless device. For example, a wireless device 222, 224, 226 may initially establish a communication link (not shown) with access nodes 202, 204, 206 (e.g., upon initialization or during a handover procedure). A plurality of data packets transmissions reported by wireless devices 222, 224, 226 may be communicated to access nodes 202, 204, 206 via communication network 220.

At step 304, the communication network 220 can associate and inspect capacity and transmission delay characteristics reported by one or more wireless devices. For example, a data scheduler 208, 210, 212 may collect and store capacity and transmission delay characteristics (e.g., buffered data, signal quality, throughput, guaranteed bit rate/non-guaranteed bit rate, busy hour, backhaul limitations/capacity, mobility, available spectrum, etc.) reported by wireless devices 222, 224, 226 at access nodes 202, 204, 206 via the plurality of data packet transmissions.

In an exemplary embodiment, a DPI based dynamic scheduler setting that interfaces with scheduler 208, 210, 212 may be configured to inspect the plurality of data packet transmissions reported by wireless devices 222, 224, 226 at inspection node 214. DPI may involve, for example, inspection of the capacity and transmission delay characteristics (e.g., buffered data, signal quality, throughput, guaranteed bit rate/non-guaranteed bit rate, busy hour, backhaul limitations/capacity, mobility, available spectrum, etc.) encapsulated in the plurality of data packet transmissions sent from wireless devices 222, 224, 226 to access nodes 202, 204, 206, e.g., inspection information. In some instances, DPI may involve inspection of the plurality of data packet transmissions beyond an Open Systems Interconnection (OSI) layer, for example, DPI may include inspection of the data portion of the data packet transmissions.

Figure 3B:
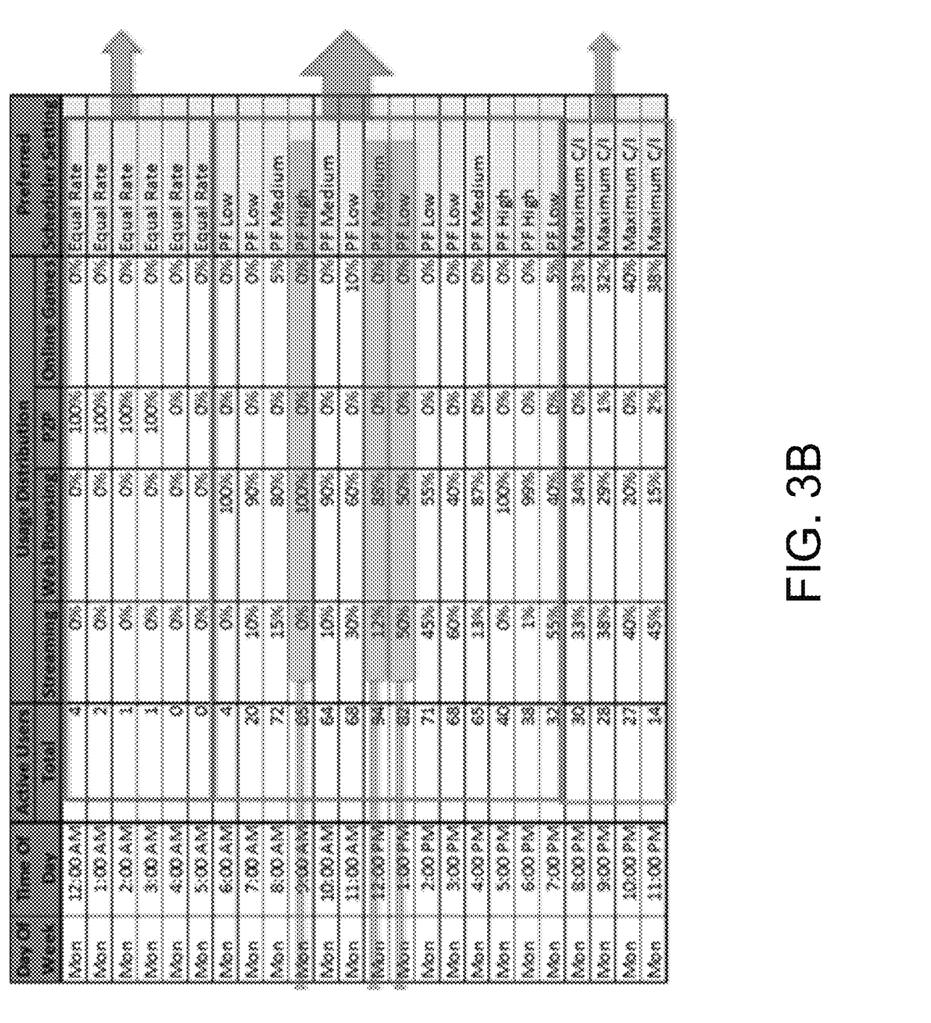

At step 306, a traffic distribution and usage pattern map associated with an access node may be determined based on DPI of the data packet transmissions performed at inspection node 214. For example, in an exemplary embodiment, gateway node 216 can dynamically configure scheduler settings for access nodes 202, 204, 206 based on a mapping of inspected data packet transmissions associated with access nodes 202, 204, 206 in geographic area 252, e.g., scheduler settings map. The scheduler settings map, illustrated in FIG. 3B, can be, for example, a look-up table configured by a service provider or by monitoring "certain conditions" that may influence the overall outcome of scheduler 208, 210, 212 behavior. In an exemplary embodiment, inspection node 214 may use the plurality of inspected data packet transmissions to monitor, for example, applications in use by wireless device 222, 224, 226 (e.g., specific applications, protocols, web sites, etc.), an amount of wireless resources (e.g., the next available physical resource blocks, wireless spectrum, etc.) being consumed by wireless devices 222, 224, 226, a number of connected wireless devices 222, 224, 226 in geographic area 252 during a predetermined time interval (e.g., 15 minutes, 1 hour, etc.,), mobility of wireless devices 222, 224, 226 in geographic area 252, a type of wireless device 222, 224, 226 (e.g., a remote terminal unit, a cell phone, a smart phone, a computing platform such as a laptop, palmtop, or a tablet, a personal digital assistant, or an internet access device, and combinations thereof), pre-paid versus post-paid wireless devices 222, 224, 226 and a correlated consumption of wireless resources (e.g., the next available physical resource blocks, wireless spectrum, etc.), application requirements (e.g., minimum data rate, maximum permitted delay, maximum data error rate, minimum performance thresholds, etc.), etc., e.g., "certain conditions." The communication network 220 uses DPI to inspect, for example, a data portion and/or header associated with the plurality of data packet transmissions sent from wireless devices 222, 224, 226 to access nodes 202, 204, 206. Inspection node 214 via gateway node 216 and communication network 220 can use the plurality of inspected data packet transmissions to determine a traffic distribution and usage pattern mapping for geographic area 252.

In another exemplary embodiment, the traffic distribution and usage pattern for wireless devices 222, 224, 226 operating in geographic area 252 may be further determined by characterizing applications in use by wireless devices 222, 224, 226. For example, applications in use by wireless devices 222, 224, 226 may be characterized as latency-sensitive (e.g., VoIP, video streaming, audio, download stream, etc.) or non-latency sensitive (e.g., internet browsing, email, text messaging, etc.) and an actual utilization rate (e.g., a measurement of data sent to/received from an application in use by wireless devices 222, 224, 226) may be determined.

At steps 308-310, a scheduling algorithm can be assigned to a particular set of usage characteristics based on the traffic distribution and usage pattern determined at step 306, the traffic distribution and usage pattern can be monitored for a set of criteria, and an appropriate scheduling algorithm can be selected based on the monitored traffic distribution. For example, inspection node 214 can use DPI to determine the traffic distribution and usage pattern of wireless devices 222, 224, 226 in geographic area 252 using, for example, the "certain conditions" associated with wireless devices 222, 224, 226 and characterization of applications running on wireless devices 222, 224, 226. The "certain conditions" and characterization of applications may be based on data obtained from inspecting the plurality of data packet transmissions reported by wireless devices 222, 224, 226 to access nodes 202, 204, 206. Access nodes 202, 204, 206 can use the schedulers setting map determined at step 306 to dynamically configure settings of a scheduler, for example, scheduler 208, 210, 212. In an exemplary embodiment, the settings of the scheduler 208, 210, 212 may be determined based on a "usage pattern versus scheduler setting map," e.g., the look-up table configured by a service provider or by monitoring "certain conditions" using a logical flow chart.

In another exemplary embodiment, access nodes 202, 204, 206 may apply a bias factor based on the data obtained from inspecting the plurality of data packet transmissions reported by wireless devices 222, 224, 226, e.g., a DPI bias factor, to the factors of a configured scheduler, for example, a proportional fairness scheduler, that influences an outcome of the configured scheduler's behavior. Dynamically configuring the settings of, for example, the proportional fairness scheduler ensures that the selected scheduler caters to traffic pattern variations within geographic area 252. This optimizes a service provider's ability to improve user experience and creates efficiencies for available wireless resources.

At step 314, an access node may transmit packet data for at least one connected wireless device using the selected scheduling algorithm and DPI bias factor. In an exemplary embodiment, access node 202, 204, 206 can dynamically configure, for example, scheduler 208, 210, 212, to optimize the distribution of wireless resources (e.g., the next available physical resource blocks, wireless spectrum, etc.) and can transmit data packets to wireless devices 222, 224, 226 from access node 202, 204, 206 based on the dynamically configured settings of scheduler 208, 210, 212.

One skilled in the art, using the disclosure provided herein, will appreciate that various steps of the methods can be omitted, rearranged, combined and/or adapted in various ways and can be completed by multiple wireless devices and access nodes, for example between wireless devices 222, 224, 226, access nodes 202, 204, 206, and inspection node 214.

Figure 4:
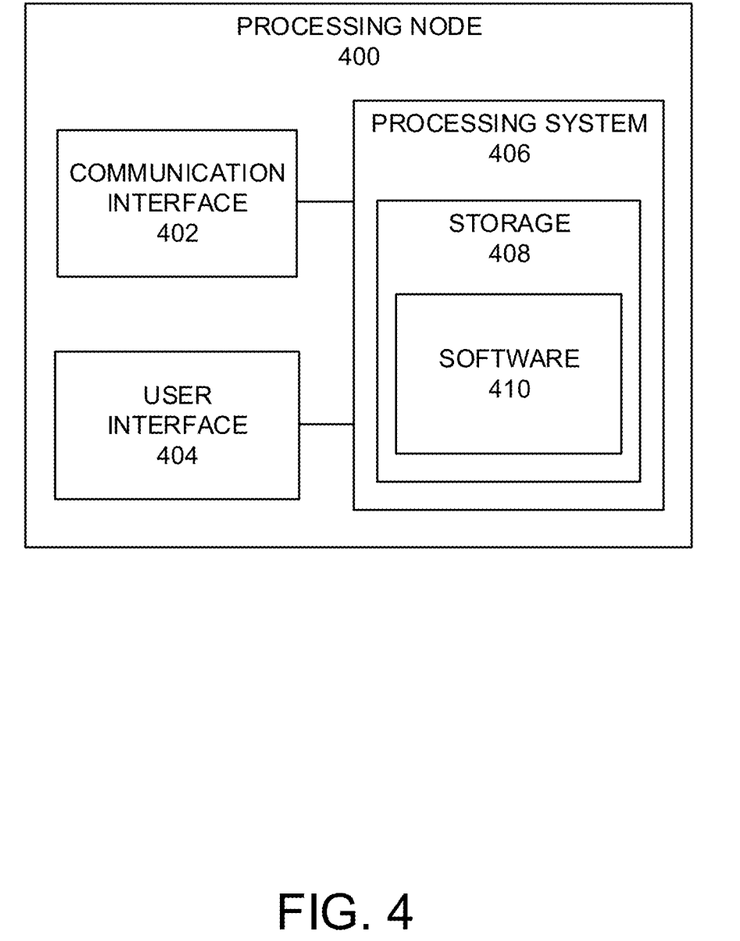
FIG. 4 illustrates an exemplary processing node.

FIG. 4 illustrates an exemplary processing node 400 in a communication system. Processing node 400 comprises communication interface 402, user interface 404, and processing system 406 in communication with communication interface 402 and user interface 404. Processing node 400 can be configured to determine a communication access node for a wireless device. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

Examples of processing node 400 include access nodes 106, 202, 204, 206, inspection nodes 110, 214, gateway node 216, and controller node 218. Processing node 400 can also be an adjunct or component of a network element, such as an element of access nodes 106, 202, 204, 206, inspection nodes 110, 214, gateway node 216, and controller node 218. Processing node 400 can also be another network element in a communication system. Further, the functionality of processing node 400 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for transmitting data packets from an access node, the method comprising:
inspecting, at an inspection node, data packet transmissions associated with multiple wireless devices operating within a geographic area;
configuring, at an access node, scheduler settings for the access node based on a generated traffic distribution and usage pattern, the traffic distribution and usage pattern being generated based on the inspected data packet transmissions of the multiple wireless devices;

updating, at the access node, scheduler settings for at least one wireless device of the multiple wireless devices using a deep packet inspection (DPI) bias factor, the DPI bias factor being determined based on results an inspection of a usage condition of the at least one wireless device; and transmitting data packets for the at least one wireless device using the updated scheduler settings.

2. The method of claim 1, wherein the data packet transmissions include a number of connected wireless devices operating within the geographic area during a predetermined time period.

3. The method of claim 2, wherein the data packet transmissions include mobility information of the at least one wireless device operating within the geographic area during the predetermined time period.

4. The method of claim 1, wherein the data packet transmissions include capacity and transmission delay characteristics reported by the at least one wireless device.

5. The method of claim 4, wherein a header of the data packet transmissions is inspected to determine an application requirement of the at least one wireless device.

6. The method of claim 5, wherein the application requirement comprises at least one of a minimum data rate, maximum permitted delay, maximum data error rate, and minimum performance threshold of an application in use by the at least one wireless device.

7. The method of claim 1, wherein the usage condition is based on an application in use by the at least one wireless device.

8. The method of claim 7, wherein the scheduler setting is a proportional fair scheduling algorithm.

9. The method of claim 1, wherein the DPI bias factor is applied to predetermined factors of the scheduler settings.

10. A system for transmitting data packets from an access node, the system comprising:

a controller node configured to:

inspect, at an inspection node, data packet transmissions associated with multiple wireless devices operating within a geographic area;

generate a traffic distribution and usage pattern based on the inspected data packet transmissions of the multiple wireless devices;

configure scheduler settings for an access node based on the generated traffic distribution and usage pattern;

update, at the access node, scheduler settings for at least one wireless device of the multiple wireless devices using a deep packet inspection (DPI) bias factor, the DPI bias factor being determined based on results of an inspection of a usage condition of the at least one wireless device; and transmit data packets for the at least one wireless device using the updated scheduler settings.

11. The system of claim 10, wherein data packet transmissions include a number of connected wireless devices operating within the geographic area during a predetermined time period.

12. The system of claim 11, wherein the data packet transmissions include mobility information of the at least one wireless device operating within the geographic area during the predetermined time period.

13. The system of claim 11, wherein the data packet transmissions include capacity and transmission delay characteristics reported by the at least one wireless device.

14. The system of claim 13, wherein a header of the data packet transmissions is inspected to determine an application requirement of the at least one wireless device.

15. The system of claim 14, wherein the application requirement comprises at least one of minimum data rate, maximum permitted delay, maximum data error rate, and minimum performance threshold of an application in use by the at least one wireless device.

16. The system of claim 10, wherein the usage condition is based on an application in use by the at least one wireless device.

17. The system of claim 16, wherein the DPI bias factor is applied to predetermined factors of the scheduler settings.

18. The system of claim 17, wherein the scheduler settings are configured using a proportional fair scheduling algorithm.

\* \* \* \* \*